April 22, 1930.  W. OSTERMAYER  1,755,267
CONTROL DEVICE FOR ELECTRIC ILLUMINATED SIGNS
Filed Sept. 3, 1925    5 Sheets-Sheet 1
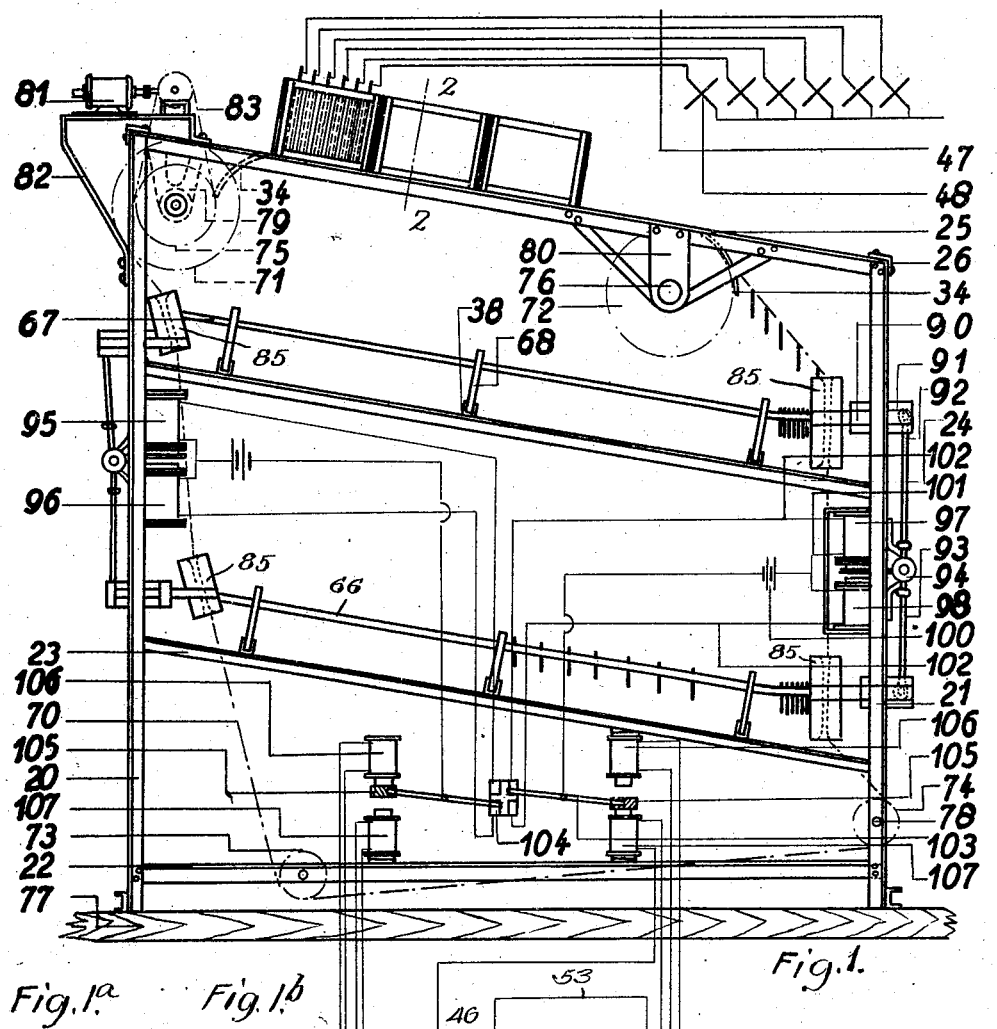
Fig.1.
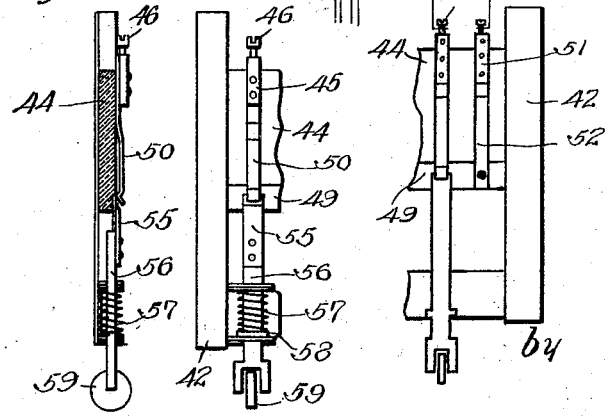
Fig.1ª   Fig.1ᵇ
Inventor:
Walter Ostermayer
by Frank Reichold
Attorney.

Inventor:
Walter Ostermayer
by Frank Reichhold
Attorney.

April 22, 1930.　　　W. OSTERMAYER　　　1,755,267
CONTROL DEVICE FOR ELECTRIC ILLUMINATED SIGNS
Filed Sept. 3, 1925　　　5 Sheets-Sheet 3
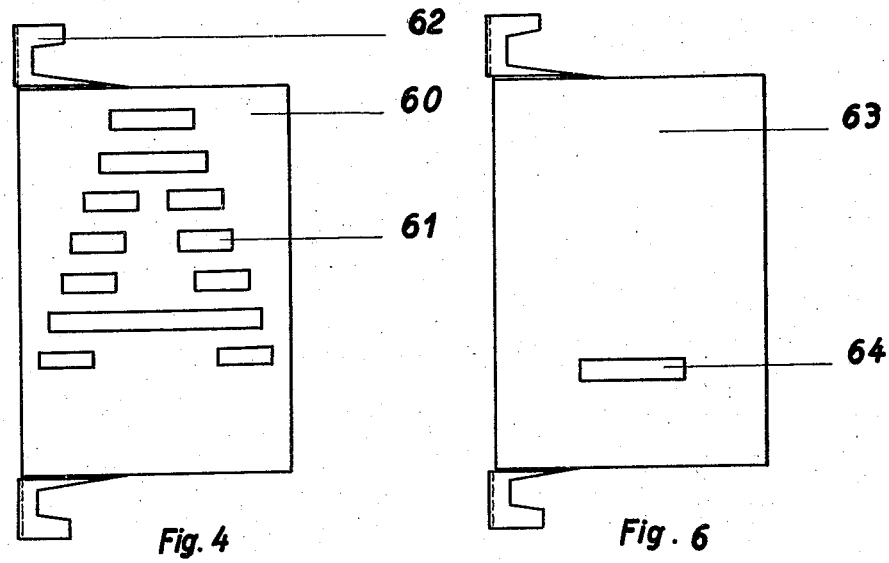
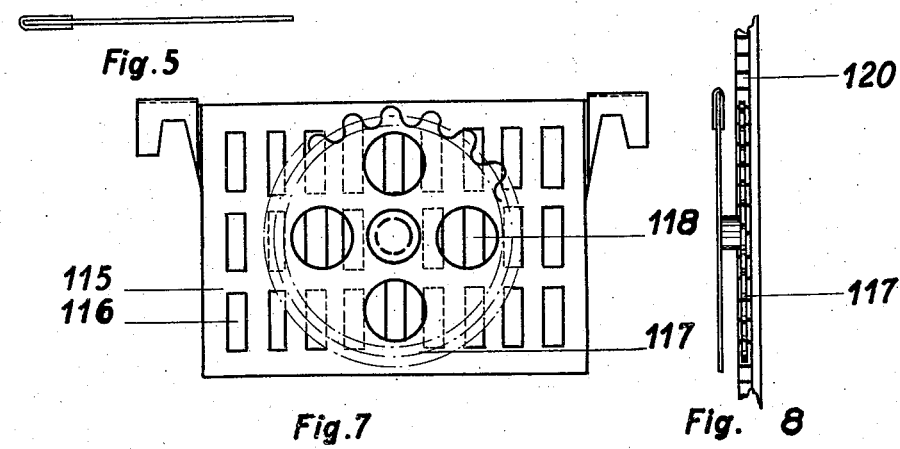
Inventor:
Walter Ostermayer
by Franz Reichold
Attorney.

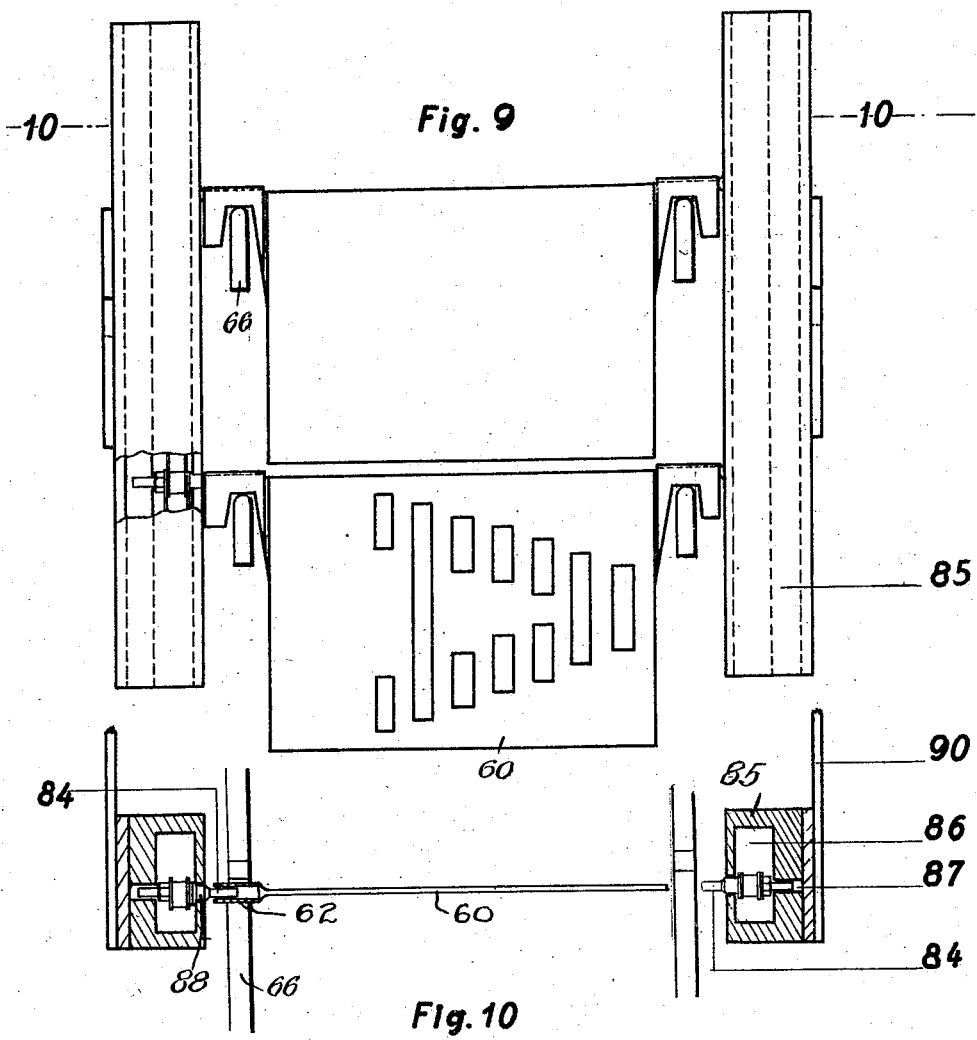

April 22, 1930.  W. OSTERMAYER  1,755,267
CONTROL DEVICE FOR ELECTRIC ILLUMINATED SIGNS
Filed Sept. 3, 1925   5 Sheets-Sheet 5

Inventor:
Walter Ostermayer
by Franz Reichold
Attorney.

Patented Apr. 22, 1930

1,755,267

UNITED STATES PATENT OFFICE

WALTER OSTERMAYER, OF BERLIN-SCHONEBERG, GERMANY

CONTROL DEVICE FOR ELECTRIC ILLUMINATED SIGNS

Application filed September 3, 1925, Serial No. 54,191, and in Germany September 2, 1924.

My invention relates to improvements in control devices for electric illuminated signs, and more particularly in control devices by means of which groups of lamps representing letters, numbers, or other signs are successively switched into energizing circuits in such a way that a sign or series of signs are made to move over the surface equipped with the lamps. One of the objects of the improvements is to provide an apparatus of this type in which a large number of controlling members can be stored and passed in continuous succession into positions for operating the switches controlling the lamp circuits, and with this object in view my invention consists in constructing the said controlling members in the form of jointed perforated plates or stencils and providing a guide way for passing the said plates in continuous succession across the rows of switches. Another object of the improvements is to provide a control device in which the power required for thus moving the controlling members is small. With this object in view I provide an endless chain or chains adapted to take up the said plates from a pile thereof and to deposit the same on the said pile after passing the same through the switch apparatus. Another object is to provide a device in which the controlling members or a part thereof may be readily interchanged without interrupting the operation of the device, so that a great variety of series of signs or letters may be displayed on the field of lamps. With this object in view I provide a plurality of members receiving the piles of plates, and I mount the said members and chains so that the chains are adapted to take the plates from any one of the said members. Other objects of the improvements will be understood from the following description of the invention.

In the accompanying drawings,

Fig. 1, is an elevation showing the improved control device,

Figs. 1ª and 1ᵇ show to larger scale, fragmentarily, in vertical section and in front elevation respectively, a detail of structure, Fig. 2, is an enlarged sectional view taken on the line 2—2 of Fig. 1, Fig. 3, is a plan view of Fig. 2 with the switches and the frame carrying the same removed, Fig. 4, is a plan view of one of the perforated plates or stencils, Fig. 5, is a view in elevation, that is to say, an edgewise view of the plate shown in Fig. 4, Fig. 6, is a view in plan similar to Fig. 4 and showing the particular stencil used for controlling the electromagnetic apparatus for interchanging the piles of stencils, Fig. 7, is a similar view in plan, showing a stencil having rotary movement in addition to the progressive movement, Fig. 8, is an elevation of the plate of Fig. 7 viewed from the left, Fig. 9, is an elevation of an enlarged scale showing the guides for the chains, and a succession of chain-borne stencil plates in position in the guides.

Fig. 10, is a section taken on the line 10—10 of Fig. 9,

Figure 2:
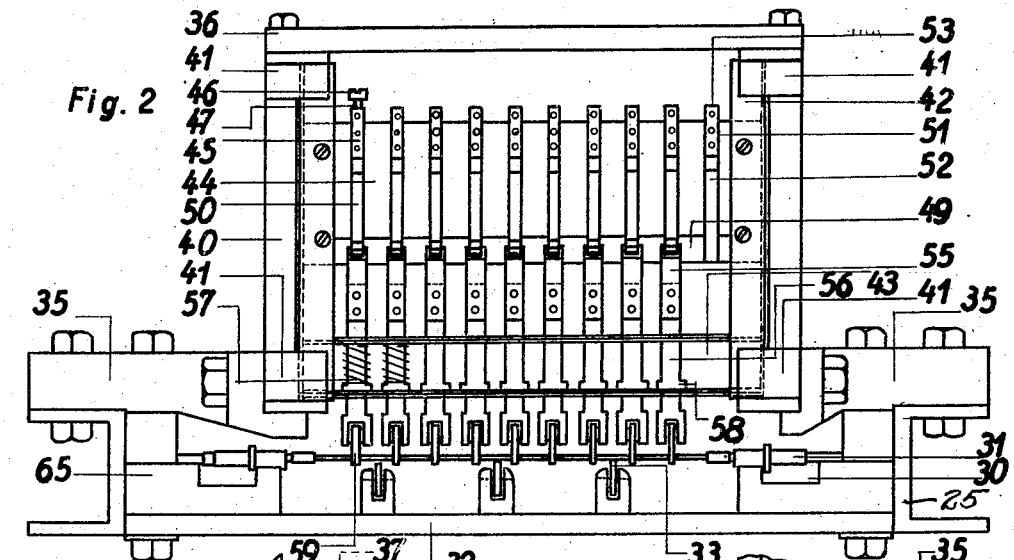
Figure 3:
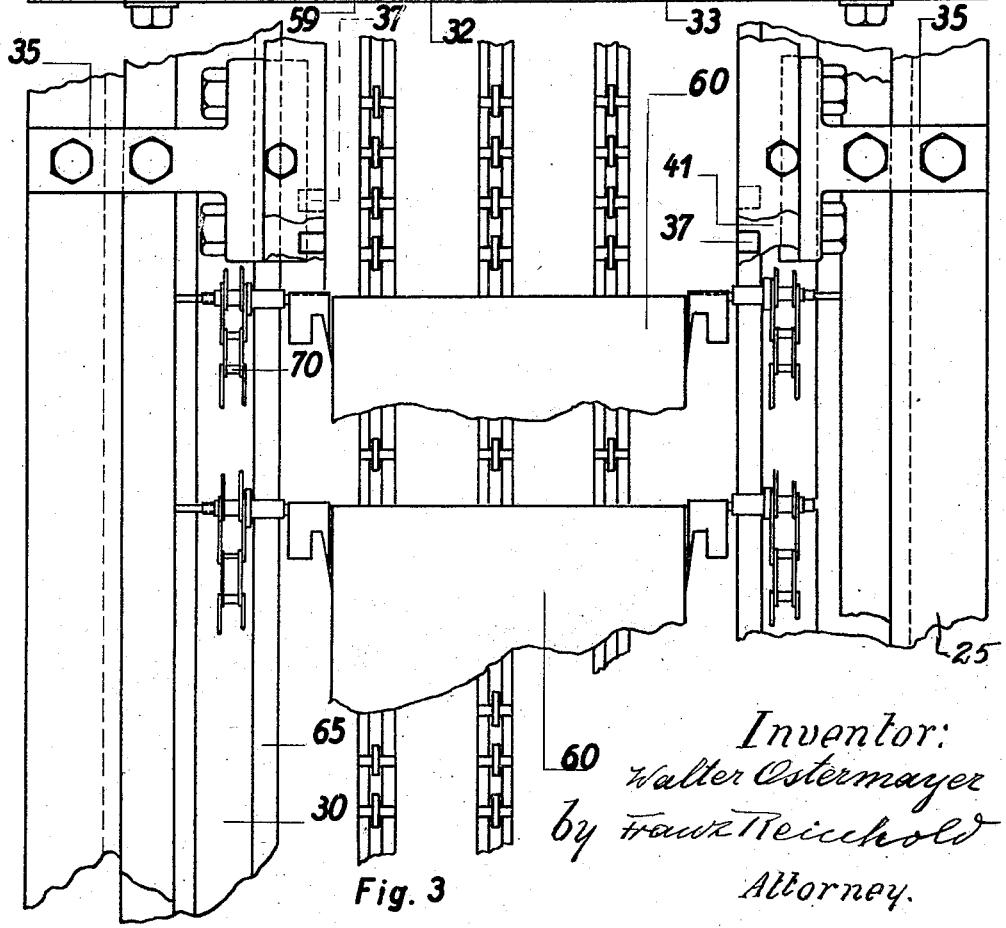

Referring now to the example illustrated in Figs. 1 to 10, my improved control device comprises two frame members each consisting of uprights 20, 21, a horizontal transverse bar 22 and inclined transverse bars 23, 24 and 25, the said frame members being connected by braces 26. To the bars 25 arms 35 are secured which provide supports for frame members each composed of upper and lower inclined rails 41, uprights 40, and transverse bars 36. The rails 41 are formed at their inner sides with notches 37 providing seats for transverse frames carrying the switches for the lamp circuits.

The construction of the said transverse frames is shown in Fig. 2. As is shown in the said figure the transverse frames consist of upright bars 42 connected at their bottom ends by a U-shaped bar 43 and near their top ends by a plate 44 of insulating material. To the plate 44 terminals 45 provided with clamping screws 46 are secured, and each of the said terminals is connected by a lead 47

(Fig. 1) with an electric lamp 48 of a field of lamps. To the bottom part of the insulating plate 44 a flat bar 49 of brass is secured, which is adapted for engagement with leaf springs 50 fixed one to each of the terminals 45. At the side of the terminals 45 there is a terminal 51 which is connected by a lead 53 with a suitable supply of electric energy and by a bar 52 with the bar 49. It will therefore be understood that electric current is supplied from the source of electric energy through the lead 53, the terminal 51, the bars 52 and 49, the leaf springs 50, the terminals 45, and the leads 47 to the electric lamps 48 for displaying signs on the field of lamps. Further it will be understood that a large number of frames 42, 43, 44 and rows of terminals 45 are provided one beside the other, secured in successive pairs of notches 37 formed in the rails 41 (see Fig. 3), and that the lamps 48 are disposed in rows corresponding to the rows of terminals 45.

Normally the leaf springs 50 are held out of contact with the bar 49 by means of insulating blades 55 carried each by a slide bar 56 guided in slots of the flanges of the bars 43, said slide bars being acted upon by springs 57 bearing with their top ends on the upper flanges of the bars 43 and with their bottom ends on lugs 58 formed on the slide bars. Thus the springs tend to force the slide bars downwardly and into positions for closing the lamp circuits through bars 49 and springs 50. At their bottom ends the slide bars 56 carry rollers 59.

The upward and downward movement of the slide bars 56 is controlled by means of stencils 60 shown by way of example in Figs. 4 and 5. The stencil 60 consists of a plate of a suitable rigid material such as brass and it is perforated at 61 so as to represent the desired letter or other sign, the stencil shown in Fig. 4 representing the letter A. At opposite sides the plate is provided with hook shaped arms 62 made from sheet metal bent to the bifurcated shape particularly shown in Fig. 5. In Fig. 6 I have shown a special stencil 63 which is similar in construction to the stencil 60. However, the perforation 64 of the said stencil is displaced with relation to the perforations 61 transversely of the stencil. The stencil 63 is a control member the object of which will be described hereinafter.

The stencils 60 are adapted to be moved below the slide bars 56 from the right hand side to the left hand side of the device, as viewed in Fig. 1, and when thus moved they normally hold the said slide bars in elevated positions, the said slide bars engaging the top faces of the stencils with their rollers 59. But whenever a perforation 61 of the stencil is in position below a slide bar 56 the spring 57 acting thereon forces the slide bar downwardly and into position with its lugs 58 bearing on the top face of the lower flange of the bar 43 and the blade 55 disengaging the leaf spring 50 and permitting the same to close the lamp circuit. For thus moving the stencils the following means are provided: To the inner edges of the bars 25 a pair of guide rails 65 are secured, the top faces of which are formed with longitudinal grooves 30 providing guide ways for endless chains 70. Some of the pintles 31 of the chains are prolonged so as to bear on the top faces of the rails 65. To the rails 65 transverse bars 32 are secured which provide supports for rollers 33 located below the slide bars 56 and providing a guide way for the stencils 60. At opposite ends of the said guide way there are curved rails 34. The stencils are suspended by the hook shaped arms 62 from inclined rails 66 and 67 supported on arms 68 secured to the inclined bars 23 and 24 respectively, and they are adapted to be taken from the said rails, carried across the rows of slide bars 56 and the rollers 33, and deposited on the rails again by means of the endless chains 70. The said chains are trained on sprocket wheels 71, 72, 73 and 74 keyed to shafts 75, 76, 77 and 78 respectively mounted on the brackets 79 and 80 depending from the bars 25 and on the bars 22 and the uprights 21. The said sprocket wheel 71 is driven from an electromotor 81 mounted on a bracket 82 through the intermediary of a chain and sprocket gearing 83. The pintles 31 of the chains 70 prolonged to bear upon rails 65, as has been said, are prolonged inwardly to afford projecting fingers 84, adapted as the chains 70 rise on the right (Fig. 1) to enter the bifurcations to which the arms 62 of the plates 60 are shaped (see Fig. 10, the assembly on the left). By such engagement the plates 60 are by the rising chains 70 raised from the rails 66 (67) and conveyed through the group of switches. Ultimately as the chains descend on the left (Fig. 1), the plates 60 by their arms 62 are brought to rest upon the left-hand end of the same rails 66 (67), and as the chains 70 progress, the pintles 84 pass freely from the bifurcations to which the arms 62 are shaped. At the ends of the rails 66 and 67 guide members 85 are provided by means of which the chains can be deflected towards and away from the rails and into and out of positions for taking the stencils from the rails and for depositing the same thereon. Each of the said guide members consists of a bar having a passage 86 made therein and formed in its inner and outer walls with slots 87 and 88. As appears from Figs. 9 and 10, the chains 70 are passed through the passages 86 and the pintles 31 are guided in the slots 87 and 88. The members 85 are movable in straight-line movement transversely of their length and in right-and-left movement, as seen in Fig. 1. To that end members 85 are carried by slide bars 90 guided in guide ways 91 and acted upon by bell crank levers 92, 93 having their fulcrums at 94. The arms 93 of the bell crank levers carry the armatures of electromagnets 95, 96, 97, and 98 mounted on the uprights 20 and 21 and adapted to be energized from a source of electric energy 100 included in circuits 101, 102, which circuits also include switch arms 103 and contacts 104. The switch arms 103 are connected with armatures 105 of electromagnets 106, 107 the coils of which are electrically connected with terminals similar to the terminals 45 and the bars 49 and the source of electric energy connected therewith. The contacts 104 are constructed so as to hold the switch arm 103 in position by friction. Accordingly as the members 85 through which the chains 70 are trained stand at one extreme or the other of their alternate right and left movement, the pintles 84 of the chains are either in line to engage the bifurcations of the arms 62 of plates 60, and by such engagement to lift the plates from the rails 66 (67), or to pass by, leaving the plates undisturbed upon their carrier rails 66 (67).

On the rails 66 and 67 the stencils 60 are arranged so that beginning from the right hand ends of the said rails as seen in Fig. 1, the stencils represent the letters or signs to be progressively produced on the field of lamps 48, so that in the operation of the device the said words or series of words or other signs are made to travel on the said field from the left to the right.

In describing the operation of the apparatus it will be assumed that the guide members 85 are in the positions in which the chains 70 take the stencils from the right hand end of the upper rail 67 and deposits the same on the left hand end of the said rail, while the stencils placed on the lower rail 66 are out of operation.

The chains 70 are moved in counter-clockwise direction (Fig. 1), and they pick up with their fingers 84 a continuously successive series of stencils from the upper rails 67, the stencils on the said rails gradually moving to the right by gravity. The stencils picked up by the chains move upwardly and they are gradually turned into nearly horizontal position by means of the curved rail 34, so that a continuous series of flat stencils moves at uniform velocity across the rows of slide bars 56, said stencils being supported on the rollers 33. When leaving the rollers 33 the stencils are supported with their rear ends on the curved rail 34 located at the left of the rollers, so that they are gradually brought into vertical position. Finally the stencils are deposited on the left hand ends of the rails 67, and they slide thereon to the right by gravity. Most of the rollers 59 move on the upper surfaces of the stencils, so that the lamp circuits corresponding thereto are interrupted. But whenever one of the perforations 61 passes below a roller 59 the slide bar 56 carrying the said roller is depressed by its spring 57, so that the lamp circuit controlled thereby is closed and the lamp illuminated. For example, by means of the stencil shown in Fig. 4, the perforations 61 permit lamps to be illuminated which are disposed relatively to one another so as to represent the letter A. As the stencil moves across the rows of rollers 59 the letter A appears to travel across the field of lamps 48, and as at a time a series of letters are displayed on the field of lamps, a whole word or a series of words or other signs appear to travel across the said field.

The rails 67 contain a large number of stencils all arranged so as to cause various sentences to be displayed on the field of lamps. After all the stencils carried by the rails 67 have been taken therefrom the chains 70 take the stencils from the lower rails 66. For this purpose the chains 70 are deflected as follows: At a suitable part of the set of stencils carried by the rails 67 there is a control member in the form of the special stencil 63 shown in Fig. 6, which stencil is adapted to operate a slide bar similar to the slide bars 56 and controlling the electromagnet 97. When all the stencils 60 have been taken from the rail 67, the said special stencil operates its slide bar and thereby energizes the relay 107, so that the switch arm 103, which before was held by friction in engagement with the lower contact 104, is rocked into engagement with the upper contact 104. Therefore the circuit 101, 102 of the electromagnet 97 is closed and the said electromagnet energized by electric current supplied by the source of electric energy 100. The armature 93 is rocked upwardly, and the upper and lower arms 92 are rocked respectively to the right and left (cf. Fig. 1), and the upper and lower right hand guide members 85 are shifted respectively to the right and left. Now the chains 70 take the stencils from the lower rails 66. In the meantime the stencils continue their movement across the rows of rollers 59 and towards the upper rail 67, and after the last one of the stencils belonging to the rail 67 has been deposited at the left hand end of the said rail, a second special stencil 63 taken from the rail 66 operates the electromagnet 95 in the manner described with reference to the electromagnet 97, so that the left hand branches of chains 70 are deflected into the position for depositing the stencils on the rails 66. After all the stencils have been taken from rails 66, the chains 70 are again deflected by means of a stencil 63 taken from the lower rails 66, so that thereafter the stencils are again taken from the upper rail.

Preferably the rails 66 and 67 are removably mounted on the bars 23 and 24, as has been indicated in Fig. 1 by the bottom ends of the arms 68 fitting in shoes 38 secured to the bars 23 and 24. Thereby I am enabled to replace the said rails by other rails carrying other series of stencils. Further, it will be understood that groups of stencils disposed on the rails 66 and 67 may be replaced by groups causing other series of words to be displayed on the field of lamps 48.

In Figs. 7 and 8 I have shown a stencil which in addition to the progressive movement has a movement transverse to the direction of the progressive movement. As shown the stencil is made in two sections, a main section 115 similar in construction to the stencil 60 and having perforations 116, and a subsidiary section 117 in the form of a disk rotatably mounted on the section 115 and formed with perforations 118. The disk 117 is formed with gear teeth adapted for engagement with a rack 120 secured to one of the rails 65. If now the stencil 115, 117 is moved across the rows of slide bars 56 some of the slide bars passing through the perforations 116 are arrested by the disk 117, while others are permitted to pass through the perforations 118 and to close the corresponding lamp circuits. In the example shown in the figures the perforations 118 permitting the illumination of the lamps rotate about the axis of the disk 117, and accordingly the illuminated lamps have a rotary movement in addition to the progressive movement. I wish it to be understood that the stencil 115, 117 has been shown merely by way of example, in order to illustrate how additional movement may be imparted to the travelling signs.

Figure 11:
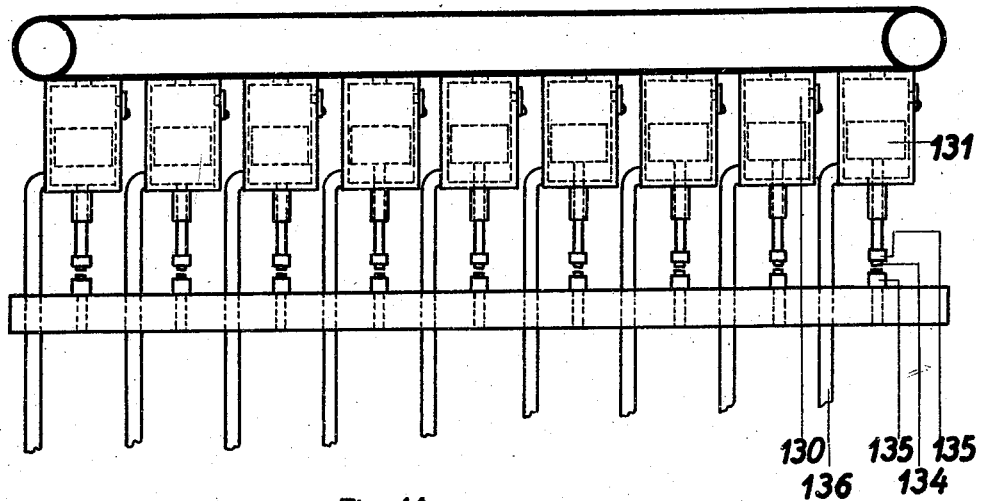
Fig. 11, is a diagrammatical sectional elevation corresponding in the position of the parts to Fig. 2, and showing a modification.
Figure 12:
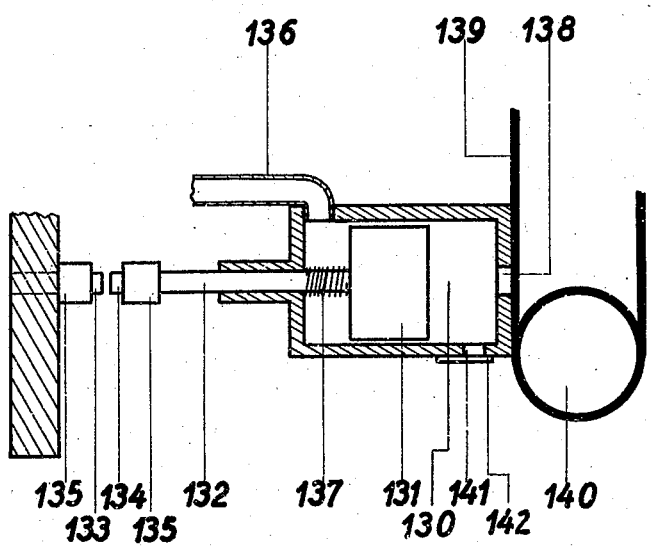
Fig. 12, is a detail sectional view showing one of the pneumatic switches.

In the example so far described the stencils open and close the switches 49, 50 through the intermediary of the slide bars 56. In Figs. 11 and 12 I have shown a modification in which pneumatic means are provided for operating the switches. As shown several rows of cylinders 130 are placed one beside the other, and each of the cylinders contains a piston 131 the rod 132 of which carries a contact 134 cooperating with a relatively fixed contact 133. The said contacts are connected by leads 135 with one of the lamps 48 of the field of lamps. Below the pistons 131 the cylinders 130 are connected through pipes 136 with a vacuum chamber, so that the vacuum within the bottom parts of the cylinders 130 tends to move the pistons 131 downwardly and into positions for closing the lamp circuits. The pistons are acted upon by springs 137 tending to move the same upwardly. The top heads of the cylinders are formed with holes 138, and above the said heads an endless band 139 is trained on rollers 140, said band being provided with perforations similar to the perforations 61 of the stencils. The top parts of the cylinders 130 are provided with holes 141 closed by valves 142, said valves permitting the escape of air from the upper spaces of the cylinders and preventing the admission of air into the said spaces. The rollers 140 are connected with suitable driving means for continuously moving the perforated band 139 over the heads of the cylinders 130. It will be understood that the band 139 may have any desired length so as to accommodate a large number of signs or letters.

In the operation of the apparatus the band 139 is made to travel across the rows of cylinders, and whenever a perforation passes above a hole 138 air is admitted to the upper space of the cylinder, so that the vacuum within the lower space of the cylinder pulls the piston 131 downwardly so as to close the lamp circuit controlled thereby. When a solid part of the band covers the hole 138 the spring 137 pushes the piston 131 upwardly, the air escaping from the upper chamber through the hole 141.

I claim:

1. In apparatus of the character disclosed, sign elements, a plurality of magazines adapted to hold each a plurality of sign elements, a conveyor for sign elements movable into alternate positions of cooperation with one or another of said magazines, and a guideway, the said conveyor being adapted to convey the sign elements from one or another of the said magazines through said guideway.

2. The combination defined by claim 1, together with a control member movable along conveyor and guideway and means operated by the advance of such control member for effecting movement of the conveyor from one to another of its alternate positions in the progress of the operation of the apparatus.

3. In apparatus of the character disclosed, sign elements consisting of perforate plates, a conveyor for sign elements, and means movable in response to advance of the sign elements by the said conveyor for varying the effective extent of the perforations thereof.

In testimony whereof I hereunto affix my signature.

WALTER OSTERMAYER.